US008365815B2

United States Patent
Viernickel (10) Patent No.: US 8,365,815 B2
(45) Date of Patent: Feb. 5, 2013

(54) SYSTEM FOR EXTRACTING AND DECONTAMINATING GROUNDWATER

(75) Inventor: Michael Viernickel, Berlin (DE)

(73) Assignee: Geo-En Energy Technologies GmbH, Berlin (DE)

( * ) Notice: Subject to any disclaimer, the term of this patent is extended or adjusted under 35 U.S.C. 154(b) by 14 days.

(21) Appl. No.: 12/679,984

(22) PCT Filed: Sep. 22, 2008

(86) PCT No.: PCT/DE2008/001577
§ 371 (c)(1),
(2), (4) Date: Sep. 7, 2010

(87) PCT Pub. No.: WO2009/039839
PCT Pub. Date: Apr. 2, 2009

(65) Prior Publication Data
US 2010/0319347 A1  Dec. 23, 2010

(30) Foreign Application Priority Data
Sep. 28, 2007  (DE) .......................... 10 2007 047 552

(51) Int. Cl.
*E21B 36/00* (2006.01)
*F03G 7/00* (2006.01)
*F24J 3/08* (2006.01)
(52) U.S. Cl. .......................... 166/57; 166/278; 60/641.2
(58) Field of Classification Search .................. 166/278, 166/302, 306, 57, 62; 165/45; 60/641.1, 60/641.2, 641.3
See application file for complete search history.

(56) References Cited

U.S. PATENT DOCUMENTS

| 2,905,245 | A | | 9/1959 | De Priester |
| 3,786,858 | A | * | 1/1974 | Potter et al. ...................... 165/45 |
| 4,030,549 | A | * | 6/1977 | Bouck ......................... 166/280.1 |
| 4,101,474 | A | * | 7/1978 | Copeland et al. ............. 523/131 |
| 4,201,060 | A | | 5/1980 | Outmans |
| 4,642,987 | A | * | 2/1987 | Csorba et al. ................ 60/641.2 |
| 4,694,905 | A | | 9/1987 | Armbruster |
| 5,322,115 | A | | 6/1994 | Hildebrand |

(Continued)

FOREIGN PATENT DOCUMENTS

| JP | 58024762 A | 2/1983 |
| JP | 58193053 A | 10/1983 |

(Continued)

*Primary Examiner* — Daniel P Stephenson
(74) *Attorney, Agent, or Firm* — Joyce von Natzmer; Agris & von Natzmer LLP (57) ABSTRACT

A system for the exploitation of geothermal heat and for conveying and decontaminating ground water is disclosed. The system comprises a main pipe (20), arranged in a pit (10) of well and is subdivided into an upper and a lower part by a transverse seal (21). The transverse seal has an opening in which a pump (22) is arranged which delivers water from the lower part of the main pipe. The pump is connected to a delivery pipe (30) which is connected to an overground closed circuit. The closed circuit at its other end leads to the upper part of the main pipe and the main pipe has through openings (23) towards the surroundings upstream and downstream of the transverse seal. The main pipe is surrounded by a porous bed which surrounds the hollow space of the pit around the main pipe. The porous bed is interrupted by a sealing material (12) at the level of the transverse seal so that the porous bed is hydraulically interrupted. The use of the system is also described.

12 Claims, 2 Drawing Sheets

U.S. PATENT DOCUMENTS

| | | | |
|---|---|---|---|
| 5,425,598 A | 6/1995 | Pennington | |
| 5,676,208 A * | 10/1997 | Finley | 166/278 |
| 2002/0036173 A1* | 3/2002 | Feke et al. | 210/748 |
| 2002/0141827 A1 | 10/2002 | Breeding | |
| 2007/0151591 A1* | 7/2007 | Jeffryes | 136/240 |
| 2008/0073058 A1* | 3/2008 | Ueyama | 165/45 |
| 2009/0056221 A1* | 3/2009 | Ramsey et al. | 47/59 R |
| 2011/0198054 A1* | 8/2011 | Viernickel | 165/45 |
| 2011/0232858 A1* | 9/2011 | Hara | 165/45 |

FOREIGN PATENT DOCUMENTS

| | | |
|---|---|---|
| JP | 61 011567 A | 1/1986 |
| NL | 1014146 C | 1/2000 |
| SU | 800 513 A1 | 1/1981 |
| WO | 85/03994 A1 | 9/1985 |
| WO | 9000707 | 1/1990 |
| WO | 9530863 | 11/1995 |

\* cited by examiner

Fig. 1

Fig 2

SYSTEM FOR EXTRACTING AND DECONTAMINATING GROUNDWATER

This is the U.S. national stage of International application PCT/DE2008/001577, filed Sep. 22, 2008 designating the United States, claiming priority to German application DE 10 2007 047 552.9, filed Sep. 28, 2007.

BACKGROUND

The invention relates to a system for extracting and decontaminating groundwater and utilizing geothermal heat and also to the use of the system according to the invention.

The utilization of geothermal heat is regarded as belonging to the regenerative energies. The temperature in the soil rises with increasing depth. Below 20 meters this increase in temperature is no longer dependent on seasons or climate, but essentially depends on geological and geothermal conditions. For this reason, the utilization of geothermal heat for energy production is a good option in many regions because emission-neutral, especially with respect to $CO_2$ emissions, and safe production of energy is possible in this way.

Various systems and processes for the utilization of geothermal heat are known from the prior art. One current method of utilization is a geothermal heat probe, such as disclosed in DE 29 35 832 A1. Therein, a U-pipe is introduced in a borehole in the soil. A liquid circulating in the tube absorbs heat from the environment in the depths, which heat is subsequently utilized. A pump is provided to support circulation. This solution is disadvantageous in that the efficiency of the system is limited for constructional reasons and antifreeze agents must be added which involve a risk of pollution.

Other alternatives subsumed under geothermal energy are geothermal heat collectors, which are remarkable for their horizontal laying close to the surface, and brine circulating therein, as well as pumpless geothermal heat collectors with direct evaporation of a refrigerant.

Groundwater offers another possible way of utilizing geothermal heat by conveying the groundwater through an extraction well to the surface where heat is withdrawn therefrom by means of a heat pump. The water is subsequently fed back into the aquifer through an injection well. This solution is disadvantageous in that separate wells are required for water extraction and injection.

The chemical and physical parameters of water withdrawn from the extraction well frequently differ from those of water in the injection wells just a few meters away so that chemical reactions and precipitation reactions take place, blocking the well in the long run. In addition, the pressure differences occurring during above-ground pumping involve the risk of out-gassing of dissolved gases and precipitation reactions associated therewith.

EP 0 386 176 B1 discloses a system for exchanging energy between the soil and an energy exchanger via a combination of a forward pipe with a pump in the borehole and a feedback pipe. The borehole is provided with a porous filling, and water is introduced into the borehole through the forward pipe to reach the feed-back pipes through the porous filling. The feedback pipes are provided with a combination of transverse seals and through-openings in the direction of the porous filling so that the water, when conveyed to the surface, is always forced to leave the feedback pipe. The special configuration of the feedback pipes is intended to increase the heat absorption of the water. This solution is disadvantageous in that implementation thereof with sufficient efficiency is only possible over long lengths.

EP 0 755 497 B1 discloses a system for extracting geothermal heat, wherein water is introduced down to the bottom of the bore in the outer region of the borehole. A shroud pipe is arranged at a defined distance to the bottom of the bore, which pipe has a pump in the lower region thereof, the pump being intended to convey water to the soil surface. The region of the bore between the outlet opening of the water-supplying pipes and the lateral opening of the shroud pipe is provided with a porous filling. Although the inventive measures of EP 0 755 497 B1 are intended to take up preferably warm water from the lower region of the bore, the existence of a hydraulic connection between supplying and discharging pipes is disadvantageous, so that preferably cold water is conveyed to the surface which has previously been introduced into the borehole. As a result, the efficiency decreases considerably.

Solutions known from the prior art preferably use separate pipes in the borehole to extract and return the groundwater, as well as a separate heat exchanger in the form of a separate system. As a result, the systems known from the prior art are complex and cause high expenses due to the requirement of larger bore diameters.

JP 58024762 describes a method for extracting geothermal heat using a main pipe provided with through-openings upstream and downstream of a transverse seal. Therein, withdrawal from a groundwater-bearing layer and introduction into a hydraulically separated, different aquifer have been depicted as being essential and fundamentally necessary. This results in mixing of different groundwaters usually having different chemical and physical water qualities, e.g. bearing freshwater and saltwater, which may give rise to precipitation reactions and blocking of the well filter sections in the long run. Also, mixing of different groundwaters is prohibited in most regions for groundwater protective and ecological reasons and involves problems in regions with groundwater utilization for drinking water production.

In a large number of countries, a technical teaching such as the one in JP 58 064 762 is therefore not permissible because it involves mixing of chemically different waters, which gives rise to problematic chemical reactions and precipitations. Apart from the resulting pollution of the environment, this also implies that the corresponding wells would be subject to damage after a certain time of use, and such damage would accumulate during the course of time, thereby resulting in total failure of the system.

Furthermore, wells for the utilization of geothermal heat have been described in the prior art, e.g. according to DE 271 54 99, DE 28 50 865, or CH 65 31 20.

SUMMARY OF THE INVENTION

The object of the present invention is to provide a system for the utilization of geothermal heat, which system ensures efficient thermal linkage.

Surprisingly, it was found that a system for utilizing geothermal heat can solve the problem according to the invention if the system has a main pipe arranged in a bore of a well, said main pipe being divided into an upper part and a lower part by a transverse seal which has an opening having a device arranged therein that triggers and/or supports a flow conveying water from the lower part of the main pipe, said device being connected with a preferably insulated extraction pipe which in turn is connected with a preferably above-ground closed circuit, said closed circuit at its other end leading to the upper part of the main pipe, and the main pipe having through-openings towards the surroundings upstream and downstream of the transverse seal, said main pipe being at least partially, preferably completely, surrounded by a porous bed which preferably surrounds the remaining hollow space of the bore around the main pipe, said porous bed (outside the main pipe) being hydraulically interrupted by a sealing material at the level of the transverse seal (inside the main pipe). The insulated extraction pipe preferably consists of double-walled polyethylene divided into compartments by longitudinal ribs and sealed pressure-tightly at its ends by welded sleeves so that the included air functions as an insulator and water flow virtually free of thermal loss is effected. Surprisingly, such a preferred extraction pipe results in particularly good properties of the device and its use. What is referred to as above-ground closed circuit in the meaning of the invention is preferably the pipe layout from the extraction pipe from the geothermal system through a heat exchanging apparatus, preferably a heat pump for withdrawal of heat or a heat exchanger for dissipation of heat for cooling purposes, and the pipe layout back to the geothermal system, including a connection on the main pipe for reinjection across the upper filter section in the upper part of the main pipe, which filter section may preferably include sieves or other water-filtering devices, stop valves and pumps as well as protective means for monitoring the water flow and water temperature.

It was completely surprising that, opposed to the prior art direction of development, an apparatus for utilizing geothermal heat, which does not make use of hydraulically separated water-bearing layers having e.g. different pressures or different temperatures, can be used very efficiently. It has not been obvious to a person skilled in the art that water withdrawal/extraction could proceed within a single horizon. To date, it has been assumed in the prior art that a hydraulic short-circuit would result unless groundwaters hydraulically separated by aquicludes would be used. Aquicludes in the meaning of the invention are in particular rocky bodies or strata having low water permeability and damming properties in relation to the groundwater.

A large number of prior art devices therefore rely on hydraulically separated water-bearing layers. However, the use of well-known devices in such hydraulically separated water-bearing layers results in mixing of chemically different waters from the diverse layers, giving rise to chemical reactions and precipitation.

As has been found in investigations of groundwater-bearing layers, the hydraulic permeability of geological formations consisting of sands and gravels is not uniform in all directions. As a rule, there is rather a directed permeability which is many times higher in horizontal direction than in vertical direction. The profile of the hydraulic permeability depends on the deposition and shape of the sediments. During the development of these geological formations they have been sedimented or washed in such a way that the water would flow essentially parallel to the ground or groundwater table and a water flow would be turned or redirected in vertical direction.

This property of groundwater-bearing sediments can be utilized in the above-described technology in such a way that e.g. groundwater is pumped from the lower part of this formation and reinjected in particular at a distance of several meters thereabove. In accordance with the permeability differences mentioned above, it is observed that the water—as opposed to the pressure differences generated in this way—does not move the shortest distance top down, but travels a long circular way round the system, which is many times longer than the shortest distance. This causes a flow through a large volume of the aquifer, triggering a heat exchange preferably in those cases where the injected water has a temperature which differs from that of the groundwater. Using temperature and performance measurements as well as tracer techniques, it was possible to derive laws governing the levels of heat exchanger capacity achievable through the use of this technology and make them useful for the construction of such systems. It was demonstrated that the pressure differences built-up essentially vertically trigger water movement virtually solely between the extraction and injection sections, influence on the groundwater surface barely occurs, and no lateral fresh waters are involved. The circulating water remains within the constructionally addressed aquifer, invariably in the same milieu, so that no chemical reactions or physical influences, e.g. via pH shifts, have to be feared. Aquicludes situated above and/or beneath add to the seclusion of this circuit. Advantageously, the preferably hydraulic linkage to the aquifer is accomplished by the configuration of the extraction and injection sections implemented in the form of passage openings in the main pipe and by means of the surrounding porous bed. Adaptation to the surrounding soil and flow control are effected by selecting the level of permeability. This results in uniform flow without turbulences, especially through the use of preferred glass spheres as porous bed and flow-optimized passage openings in the form of peripherally widening slots preferably made of stainless steel and adjustment of the openings in such a way that higher permeability is provided at greater distances from the transverse seal both in the extraction section and injection section. Thus, the pressure build-up between the extraction and injection sections is influenced in a way so as to additionally increase long-range vertical flow.

In a preferred embodiment of the invention the main pipe arranged in the bore of a well is arranged centrally. The sealing material which interrupts the porous bed can preferably be any of a swellable clay, a cement or a comparable, permanently flexible material.

DETAILED DESCRIPTION OF VARIOUS AND PREFERRED EMBODIMENTS

The system or device according to the invention has the above-mentioned transverse seal preferably half-way up the surrounding loose rock saturated with groundwater. It is of course also possible to have the transverse seal positioned in the lower or upper third, quarter, sixth, eighth, or in a completely different way, which in particular depends on the hydraulic properties of the surrounding loose rock saturated with groundwater. Without any inventive effort, a person skilled in the art can determine a suitable position by assessing the hydraulic properties of the loose sediment and taking account thereof in a thermohydraulic numerical (flow) simulation. The transverse seal may also be a block of material arranged around the main pipe or traversing the main pipe. If the transverse seal is placed outside around the main pipe, the main pipe has a device or features inside making sure that the inflowing groundwater passes e.g. the pump or any other device that initiates or causes flow. Accordingly, the sealing material and the transverse seal are operatively connected so as to ensure a directed flow behavior of the groundwater flowing into the main pipe at the bottom thereof. In the meaning of the invention the transverse seal and the sealing material may form a unit or may consist of two different elements. Advantageously, a main pipe is therefore mounted in a bore, which is preferably arranged centrally in the bore and, owing to the presence of the sealing material and the transverse seal, has two different filter sections situated at a distance above each other.

Groundwater flows in through the through-openings via the porous bed preferably constituted of glass spheres, which surrounds the lower part of the main pipe, and re-emerges into the soil at the upper part of the main pipe, i.e. above the sealing material or the transverse seal, after being passed through the essentially above-ground closed circuit and re-introduced from there through the main pipe, said introduction of water into the soil representing the outflow of water that flows out of the above-ground closed circuit. The water introduced from the closed circuit is passed into the soil through the through-opening and the surrounding porous bed above the transverse seal, which is preferably constituted of glass spheres. Owing to the combination of inventive features, the flow rates are very low and turbulences barely occur so that there are few or even no chemical, biological or other precipitation reactions attributable to other causes.

Most surprisingly, combining features such as the porous bed preferably made of glass spheres and other features of the invention results in an improved device or improved uses of utilizing geothermal heat. The porous bed around the main pipe provides low flow rates in an optimized manner, prevents bacterial occupation as a result of the smooth surfaces of the glass spheres and thus induction of biological reactions, e.g. oxidation of iron associated with degradation products blocking the system in the long run.

Furthermore, the invention envisages that the through-openings can be in the form of filter sections. The intention of this inventive measure is to ensure that dissolved particles would not give rise to blockage of the through-openings and thus interruption of the conveying circuit. Incidentally, the design of the lower through-openings in the form of filter sections additionally ensures that the pump arranged in the main pipe is not damaged by solid components.

The modern thermohydraulic flow simulation in the form of numerical computer programs, preferably forming the basis of the technical teaching presented above, was derived and validated from numerous investigations and serves in particular in dimensioning the porous bed surrounding the main pipe and arranging the through-openings and the aperture area thereof. In this way, the hydraulic connection to the groundwater horizon for the intended concentric vertical circulation within the groundwater horizon is regulated. As a result of the hydraulic permeability of the porous bed and pipe apertures graded in accordance with the simulation, the amount of water on the different levels is adjusted in such a way that maximum distance lateral flow through the aquifer results and, as a consequence, a local pressure balance is adjusted at the same time so that no groundwater table depression cone is formed. The flow control formed in this way prevents hydraulic short-circuit which would otherwise occur in the vicinity of the barrier layer and substantially reduce the performance in accordance with the previous state of the art. At the same time, such flow control can ensure uniform through-flow across the entire length of the filter, which is of crucial importance in minimizing the velocities encountered and the turbulences associated therewith.

The features of the invention are intended to ensure that the circulating water has sufficient time and distance for maximum heat transfer and, at the same time, particles that are present would not result in blockage of the through-openings and thus interruption of the conveying circuit. Incidentally, the design of in particular the lower through-openings in the form of filter sections additionally ensures that the pump arranged in the main pipe is not damaged by solid components.

Filter section in the meaning of the invention is understood to be a section wherein the medium to be filtered, preferably groundwater optionally contaminated with suspended matter and pollutants, passes through the filter. The filter section can also be divided into a plurality of filter sections through which the flow passes non-horizontally or vertically, and which are connected to each other either directly or via flow sections free of filter material. Porous beds, preferably made of glass spheres, or microfilters or membrane filters, or materials separating solid components of the water by means of pores of different sizes can be used as filter materials. The through-openings of the filter sections should preferably be in the form of transverse slits increasing in width from the inside to the outside, preferably 1 to 4 mm, so that no relevant acceleration of flow takes place across the depth thereof and the surrounding porous bed is easily accessible in the event of a cleaning operation from the inside to the outside, e.g. with a pressurized water jet. For example, this can be effected by a bed of filter gravel or other preferably round bodies, the diameters of which must be adjusted preferably to the surrounding loose rock, the filter openings in the main pipe and the desired hydraulic processes in accordance with the thermohydraulic numerical flow simulation.

In the meaning of the invention it is especially advantageous in this embodiment if the effective pore space, or hydraulic permeability, is in a range of more than 30% and very high up to maximum uniformity of the single components of the bed material with respect to size and sphericity is present, which is effected through the preferred use of glass spheres having a preferred diameter of from 0.5 to 10 mm, particularly from 1.5 to 5 mm. It was completely surprising that glass spheres can be used for the bed with surprising advantages. Owing to their uniform caliber, they allow maximum width of the passage openings, are mechanically more stable than filter gravel conventionally used in well technology, chemically neutral and very firm, and, owing to their smooth surfaces, insensitive to adhering bacteria and dirt and easy to clean.

It is the combination of the depicted features of the passage openings, porous bed and dimensioning thereof that forms the basis for the insensitivity of the device and its use to otherwise problematic precipitation reactions and blockage of groundwater systems.

Accordingly, the teaching of the invention represents a combination wherein a plurality of elements cooperate to achieve a technical overall success. Using thermohydraulic numerical flow simulation, the solution of the technical object is accomplished by the functional interaction of the single elements of the inventive combination with the surrounding loose rock. The combined elements in the combination according to the teaching of the invention cooperate to achieve an integral goal. The integral technical success of the invention is based on the effects of the single elements which, so to speak, represent a link for the combination according to the invention. To a person of average skill in the art there was no stimulus from the prior art to have precisely the claimed elements of the inventive combination cooperate within a groundwater horizon. It was completely surprising that a system for utilizing geothermal heat in an aquifer could be designed and dimensioned such that operation thereof is particularly efficient and trouble-free if the porous bed surrounding the main pipe at least partially, preferably completely, and the through-openings of the main pipe are designed in the form of filter sections in accordance with the results of a thermohydraulic numerical flow simulation and have the features described above.

It was not obvious to a person skilled in the art that cooperation of the claimed components in accordance with the system of the invention would furnish particularly good results in the supply or dissipation of heat over a long period of time because a distance between the extraction and injection sites of groundwater utilized for heat exchange of more than three times of the implementation recommended herein has been regarded as indispensable in the prior art.

These features, in combination with the transverse seal within the main pipe, thereby preferably hydraulically interrupting the porous bed made in particular of glass spheres, result in a device which can be used for both supply and dissipation of heat. It was not obvious to a person skilled in the art that cooperation of the claimed components in accordance with the system of the invention, or in accordance with the device of the invention, would furnish particularly good results in the supply or dissipation of heat over a long period of time.

A distance between the extraction and injection sections of at least 15 meters has been regarded as indispensable in the prior art, whereas the device according to the invention reduces the distance between the extraction and injection sections to significantly less than 10 meters and down to 5 meters.

The teaching according to the present application is remarkable for the following features:

Departure from conventional technologies: while up to now at least two wells at a distance of at least 15 meters were found to be necessary for efficient heat exchange with the groundwater, the use of the present invention, applying modern numerical thermohydraulic simulation procedures, allows vertical stacking of these wells within a single bore, wherein a distance of significantly less than 10 meters of the main pipe passage openings in the form of filter sections has to be met.

New field of problems: the combination of elastic heat exchanger pipes preferably made of e.g. polyethylene or stainless steel allows low-cost installation easy to accomplish, which can be dismantled with similar ease, e.g. for maintenance purposes, and allows high heat exchanger performance without extracting potentially aggressive waters in sensitive user structures.

Existence of a long-unsatisfied, urgent need for the solution of the problem solved by the invention: particularly in urban areas and similarly restricted places, high-performance utilization of geothermal energy has not been feasible as yet, but is now possible with the present invention even in economic terms.

Hitherto vain efforts in the art: optimizing the heat transfer in conventional probe system has reached the end of its potential in the prior art, the surrounding soil restricts heat transport so that higher performance is only possible through multiple installations. Extraction and injection of groundwater has regularly resulted in problems during injection so that this technology is used only under few circumstances.

Simplicity of a particular solution indicates inventive activity, especially as it replaces more complicated teachings: the mere movement of naturally occurring groundwater below the groundwater table mobilizes the heat potential of a large area of influence and seasonal thermal regeneration, the induced vertical circulation allows extensive collection of thermal energy with only minor changes in temperature and without the problems triggered by oxygen contact or changes in pressure.

Development in scientific technology has proceeded in a different direction: up to now, coping with the problems of chemical reactions and precipitation reactions in well systems has been implemented by maintaining the pressure and nitrogen treatment instead of operating in a small area within a uniform chemical and physical medium in order to avoid these problems; also, the use of special filter beds and filter pipes is suitable for avoiding adherence of bacteria and other material, reduce turbulences and allow largely unrestricted access for maintenance.

Achievement that rationalizes development.

Erroneous ideas in the art on the solution of the problem at issue (prejudice): the directed hydraulic permeability of groundwater-bearing loose rock in horizontal direction is up to 10 times higher than the vertical permeability, thereby allowing utilization even of small groundwater horizons in the form of vertical through-flow in a large radius, which has previously been considered impossible, instead of installing two wells situated at a great distance from each other and inducing horizontal flow.

A technical progress is the enhancement of the heat exchanger performance achievable within a single bore, resulting in lower expense and savings of time and material during installation, enhanced reliability in operation, extensive maintenance freedom.

Fortunate choice because one has been selected, the result of which has not been predictable, this therefore being a patentable fortunate choice.

Errors in the technical literature or highly contradictory representation of the subject matter of the invention.

Young field of technology.

Combination invention, i.e., several known elements have been combined to achieve a surprising effect: only by introducing modern geothermal measuring methods and numerical thermohydraulic simulation procedures it has been possible to construct and install efficient systems with little effort, while observing the legal and technical framework conditions.

Issue of licenses.

Praise in the art.

Economic success.

In particular, the advantageous embodiments of the invention have at least one or more of the advantages mentioned above.

It was completely surprising that the combination of a main pipe which is placed in the bore of a well and has through-openings towards the surroundings preferably in the form of filter sections, in association with at least one transverse seal in the main pipe in combination with an insulated extraction pipe preferably connected to a pump, said extraction pipe being connected with a preferably above-ground closed circuit, results in an improved system, or improved use of the system, for utilizing geothermal heat, if said closed circuit at its one end leads to the upper part of the main pipe and the main pipe has through-openings towards the surroundings upstream and downstream of the transverse seal, and the main pipe is surrounded by a preferably porous bed which surrounds the remaining hollow space of the bore around the main pipe, said porous bed being interrupted by a sealing material at the level of the transverse seal inside the main pipe so that the porous bed is hydraulically interrupted.

The heat exchangers are preferably arranged in the flow path between the transverse seal and the injection section, e.g. in the ascending flow in the main pipe or, e.g. in the event of great depths, in the downwardly directed flow, in which event the main pipe is designed in the form of a double pipe, preferably upstream of the transverse seal, e.g. in the form of a coaxial pipe by introducing an additional riser pipe, around which the heat exchanger pipes are arranged in the downwardly directed flow, but preferably always below the groundwater table.

In addition, the system according to the invention is remarkable in that, in the end, only one pipe must be introduced into the bore, in combination with the special configuration and arrangement of the bed sealingly formed between the filter sections.

There are only very low, uniform flow rates with laminar flow profile within a chemically and physically identical medium in the system according to the invention, thereby minimizing the occurrence of precipitation reactions of substances dissolved in the groundwater and the activity of bacteria (e.g. those oxidizing iron). Surprisingly, the inventive combination of technical features results in a minimization of bacterial activity.

Inter alia, the advantageous developments of the inventive system for utilizing thermal energy result in only minor intervention in the water budget and thus in the ecological system as a whole. The essential reason for this is that, ultimately, the groundwater is merely set in motion rather than extracted so that a system in accordance with the present invention is unproblematic with respect to official permission procedures because groundwater extraction fees and monitoring obligations in the event of reinjection are dispensable.

Advantageously, a system in accordance with the present invention causes only minor thermal influences as opposed to strong local overheating or cooling in closed (probe) systems of the prior art.

The system according to the invention is also remarkable for a 5 to 10 times higher performance in utilizing thermal energy compared to previously known systems.

In the meaning of the invention the device that triggers or initiates flow can be e.g. an electrical or mechanical device or a combination of both. In the event of a mechanical device, a screw, an impeller or the like can be envisaged, for example, and a pump in the event of an electrical device. In a preferred fashion these devices or parts thereof are arranged in the opening of the transverse seal. Of course, it can also be envisaged to arrange the pump or vital elements of the mechanical arrangement, preferably the screw, above-ground so that only parts of these units are positioned in the opening of the transverse seal. In the meaning of the invention it should preferably be ensured that flow between the upper part and the lower part of the main pipe takes place, i.e. particularly upstream and downstream of the transverse seal which may also be referred to as sealing jacket. The use of a pump is preferred because it is inexpensive and energy-efficient, available on the market, well controllable and easily replaceable. Obviously, it is also possible to have the pump completely arranged in the opening.

For example, the porous bed surrounding the main pipe at least partially, preferably completely, so as to fill the remaining hollow space of the bore around the main pipe can be constituted of gravel, relatively small or large stones, detritus, as well as defined spheres. The grain size of the bed can preferably be in the range of 1 mm—e.g. in the event of fine gravel or spheres—up to a range of 20 mm, i.e. the range of coarse gravel. As is well-known to a person skilled in the relevant art, the porous bed or porous material system is constituted of a solid phase, the particles, and the interstices (hollow space). Inside the porous bed there are continuous, accessible non-continuous and closed pores. As a consequence, there are perfusable and non-perfusable porous areas. According to the present application, these perfusable porous areas are claimed, which are formed by filling sand, gravel or similar particles, preferably ceramics or more preferably glass. Most surprisingly, the bed of glass results in especially surprising advantages. In a particularly preferred fashion the bed is in particular a glass bed of glass spheres. The porous layer is defined by its porosity and solids content. In the meaning of the invention the porosity of a respective bed is understood to be a measure for the density of the bed with its hollow spaces. Consequently, it can also be defined as relative density compared to a massive material. The overall porosity of the bed is given by the sum of hollow spaces connected with each other and with the surroundings and hollow spaces not connected with each other. The porosity of beds describes the volume of hollow spaces that can be occupied by motile, migrating media such as water and/or gas. Thus, for example, gravel has an overall porosity of up to more than 40%. It is also possible to use the term "degree of leakiness" for the overall porosity.

At the level or within the range of the transverse seal inside the main pipe the porous bed is interrupted by a sealing material, which material can be clay, for example. Mineral grains of natural origin with a grain size or an equivalent diameter of less than 20 μm, preferably less than 10 μm, more preferably less than 2 μm, are referred to as clay in the meaning of the invention. More specifically, clay in the meaning of the invention can be clay minerals comprising silicon, oxygen, hydrogen as well as magnesium and aluminum. For example, this may involve silicates or the minerals goethite or gibbsite which are not silicates.

It is of course also possible to use calcium silicate with shares of aluminum and iron as sealing material for the transverse seal.

Special attention should be devoted to the design of the filter section which ensures continuous development of groundwater velocity from the periphery in loose rock to the interior space of the main pipe and must be adjusted to the surrounding geological formation in vertical and horizontal direction in its hydraulic parameters of permeability. This requires investigations of the loose rock, using core samples, and adjustment to the passage openings in the main pipe. The passage openings preferably widen outwardly, e.g. in a wedge-shaped design of the ribs between the openings, so that colmation is avoided, impairment of flow is low at maximum opening for minimum energy consumption of the circulation pump, and good access for high-pressure jet cleaning or other maintenance procedures is provided. In this way, the occurrence of whirls and turbulences is minimized which would cause premature ageing of the well. The bed material to be used represents an elastic bearing of the well casings, providing protection e.g. in the event of earthquakes and minor landslides and allowing optimum hydraulic linkage. In a preferred fashion a bed material with smooth, optionally polished, surfaces as porous filling is suitable to effect high throughput with a minimum of adhering material so that continuous distribution of coarse grains on the borehole wall up to the fine sand in the periphery is present during initial development of the well. The bed material should have sufficient mechanical and chemical stability as well as high dimensional stability of the diameters so that large passage openings in the main pipe are possible.

It is envisaged in another particularly preferred embodiment of the invention that the device inducing flow is a pump. In a preferred fashion, low-speed centrifugal well pumps with wet-rotor submersible motor in permanent-magnet technology and with well-protecting smooth start via frequency inversion are employed. Using the pump, a flow of water is conveyed from the lower region of the geological formation through the lower part into the upper part of the main pipe and reinjected from there into the groundwater horizon. Apart from the negligible pipe resistance, the pump must overcome the hydraulic resistance in the perfused aquifers. If, for example, a screw, or conveyor screw, is used instead of the pump, it will involve a shaft having one or more helically wound flights coiled thereabout, preferably in the form of flat metal sheets, rubber sheets or other selected plastics or metals or ceramics. To this end, the shaft is placed in a pipe or half-pipe. The conveyor screws can be designed in the form of rigid or flexible screws. In the event of flexible screws, the shaft will also be flexible. It is of course also possible to do without a shaft so as to provide a coreless screw, or spiral, in which event the boundaries rotate about their own curved axis. Advantageously, the stabilizing effect of the rigid shaft in this event is achieved by profiles incorporated in the spiral. If the inventive device for inducing, supporting, initiating and/or maintaining a flow is a pump, it will be used as a fluid energy machine wherein the energy inherent in the water fluid is increased by mechanical work input. The pressure of the water is increased or kinetic energy is imparted thereto, preferably for the purpose of locomotion. According to the invention, pumps also include stirrers or modified compressors or fans. In particular, the pumps can be in the form of displacement pumps or flow pumps. Of course, the pumps may also be jet pumps such as water-jet pumps, mammoth pumps, bubble pumps, hydraulic rams or horse-head pumps. If the pumps used are displacement pumps, they can be e.g. membrane pumps, rotating piston pumps, eccentric single-rotor screw pumps, impeller pumps, piston pumps, peristaltic pumps, screw displacement pumps, sinus pumps or toothed-belt pumps. If the pumps are flow pumps, they can preferably be axial pumps, diagonal pumps and/or radial pumps.

It is envisaged in another preferred embodiment of the invention that the sealing material separating the porous bed can be clay or cement or other compact materials which, advantageously, can be purchased at low cost or allow radioactive or magnetic or other labeling in order to prove the correct mounting position thereof. Clay and clay minerals can be used synonymously in the meaning of the invention. Clay in the meaning of the invention is a main soil type of fine soil. Clay minerals according to the invention are, for example, materials comprising kaolinite, chrysotile, illite, chlorite, montmorillonite, beidellite, nontronite, saponite or others. Clay minerals are very soft, give a plastic reaction upon mechanical load and can undergo conversion into harder, solid materials upon heating, such as ceramics. Clay minerals have a large specific surface area so that substances can be adsorbed and desorbed. Advantageously, clay minerals or clays have low water permeability and can therefore be used as sealing materials in a surprisingly effective manner. Also, various types of cement are highly suitable in sealing. Cements with different chemical and physical properties, especially with respect to their sealing properties, can be produced by grinding various additives thereinto, such as metallurgical sand, pozzolana, flue ashes and/or limestone. Clay or cement is surprisingly well suited to effect hydraulic separation of the porous bed. More specifically, clay pellets can easily be incorporated as bulk material to undergo swelling within several hours to form a homogeneous, permanently flexible mass without the risk of penetrating the adjacent porous bed and thus giving rise to undesirable hydraulic sealing thereof.

It is envisaged in another preferred embodiment that water as heat carrier is preferably situated in the insulated extraction pipe, or that the water heat carrier circulates in the pipes of the preferably above-ground circuit. These pipes are preferably those operatively connected with the closed circuit above-ground. According to the invention it is envisaged that heat transfer takes place in the preferably above-ground closed circuit. In a preferred fashion a part of the extracted groundwater can be conducted out of the closed circuit so that more warm groundwater can follow, which surprisingly results in increased performance.

The essentially above-ground heat transfer in the closed circuit may take place using well-known heat transfer elements.

In a preferred embodiment of the system according to the invention, pipes including the heat carrier are situated in the closed circuit pipes arranged above-ground.

According to the invention it is envisaged that e.g. the above-ground pipes including the heat carrier are designed in the form of plates having suitable cavities for water circulation. Such plates preferably have cavities arranged e.g. in the form of honeycombs through which a heat carrier can flow.

In another preferred embodiment of the invention the main pipe is preferably made of PVC, steel, especially stainless steel, or a combination thereof. The heat exchangers, e.g. the heat exchanger pipes in particular, can be made in particular of steel, preferably stainless steel, polyethylene or copper, or a combination of these materials. Apart from PVC, it is of course also possible to use any other thermoplastic material, especially an amorphous thermoplastic material. Apart from the polyethylene specifically mentioned, it is also possible to use other polyolefins.

Accordingly, the invention also relates to the use of the inventive system for the extraction of geothermal heat, but also for the dissipation of heat and, in addition, for the decontamination of groundwater, as well as production of electricity.

Surprisingly, the system according to the invention allows combining the extraction of geothermal heat with dissipation of heat to good effect so that such a system can be used for heating or warming of buildings in the event of low ambient temperatures, e.g. during winter, and for cooling of buildings in the event of high ambient temperatures, e.g. in midsummer. Only minor constructional modifications of the system between the different types of use are required to this end, which can be performed without any inventive effort by a person skilled in the art.

Accordingly, the groundwater temperature can also be used for cooling so that the system is very well suited to utilize thermal energy for withdrawing heat through direct dissipation of heat from heat carriers circulating in cooling surfaces, or as cold water set for compression air conditioning systems. Consequently, the extracted groundwater not only can be used in the utilization of geothermal heat, but it can also be envisaged in an advantageous embodiment that the extracted groundwater is used for cooling, thereby implementing seasonal heat storage in a synergistic manner and substantially increasing the possible annual heating and cooling work of the system in the long run. Accordingly, the system can also be used for the dissipation of heat.

Apart from extraction of geothermal heat and dissipation of heat, the system can also be used for the production of electricity without problems if, for example, thermoelectric components of the inventive device are installed or extraction from depths with temperatures of more than 100° C. for turbine operation is possible.

Most surprisingly, the system according to the invention is also suitable for the decontamination of groundwater.

Likewise, the system according to the invention can be used as extraction well, or the performance thereof can be increased by partial withdrawal of the circulating groundwater.

In the context with decontamination, the systems according to the invention can initially be used for monitoring the groundwater. If, as a result of such observing or monitoring activity, amounts of substances indicating contamination are detected in the affluent groundwater, it is possible to decontaminate the perfused soil or the passing contaminated water and determine the distribution of the contaminations. The use of the system according to the invention in decontamination involves a hydraulic remediation process wherein withdrawal and infiltration preferably take place in the same borehole. In this way, lateral mobilization or dispersal of pollutants is avoided and a local cleaning effect develops, or, in the event of rapidly flowing groundwater, a barrier having a cleaning effect is erected. Depending on the pollutant, the systems for the actual decontamination can be installed underground or above-ground, and stripping processes should be specifically mentioned.

Another aspect of the invention relates to the use of the device according to the invention for the extraction of groundwater.

Of course, the advantages described for the device and preferred variants thereof also apply to the uses of the devices according to the invention and preferred variants thereof.

Furthermore, it is envisaged that the circulation in the pipes with heat carrier is supported by an additional pump. The heat carrier can be selected in such a way that it evaporates upon heating. Consequently, the extracted groundwater not only can be used in the utilization of geothermal heat, but it is also envisaged according to the invention that extracted groundwater can be used to effect evaporation of a heat carrier circulating in separate heat exchangers. In a preferred fashion, PVC, stainless steel or a combination thereof is used as material for the main pipe of a system according to the invention. However, it is also possible to select other materials with comparable properties so that the invention comprises these materials as well.

The use of stainless steel, polyethylene or copper or a combination thereof is preferably envisaged for the pipes including the heat carrier.

The system according to the invention is remarkable in that, in the end, only one pipe must be introduced into the bore, in combination with the special arrangement of the bed sealingly formed between the filter sections. Separate extraction and injection wells are not required. As opposed to conventional extraction and injection wells, only one bore and only one filter pipe therein and an insulated extraction pipe are required, thereby reducing space and cost requirements.

There are only very low and slow flow rates in the system according to the invention, thereby minimizing the occurrence of precipitation reactions of substances dissolved in the groundwater.

Furthermore, compared to conventional extraction and injection wells, a system according to the invention has substantially less influence on the groundwater table and groundwater flow because the water is reintroduced at virtually the same site from where it has ultimately been withdrawn. This also reduces the risk of chemical modification of the water.

The system according to the invention is also remarkable for a 5 to 10 times higher performance in utilizing thermal energy compared to previously known systems.

Accordingly, the invention relates to a system for utilizing geothermal heat and to the use of a system according to the invention. According to the invention, a system for utilizing geothermal heat is provided with a main pipe centrally arranged in a bore of a well, said main pipe being divided into an upper part and a lower part by a transverse seal which has an opening having a pump arranged therein that conveys water from the lower part of the main pipe, said pump being connected with an insulated extraction pipe which in turn is connected with an above-ground closed circuit, said closed circuit at its other end leading to the upper part of the main pipe, and the main pipe having through-openings towards the surroundings upstream and downstream of the transverse seal, said main pipe being surrounded by a porous bed which surrounds the remaining hollow space of the bore around the main pipe, said porous bed being interrupted by a sealing material at the level of the transverse seal inside the main pipe so that the porous bed is hydraulically interrupted.

Figure 1:
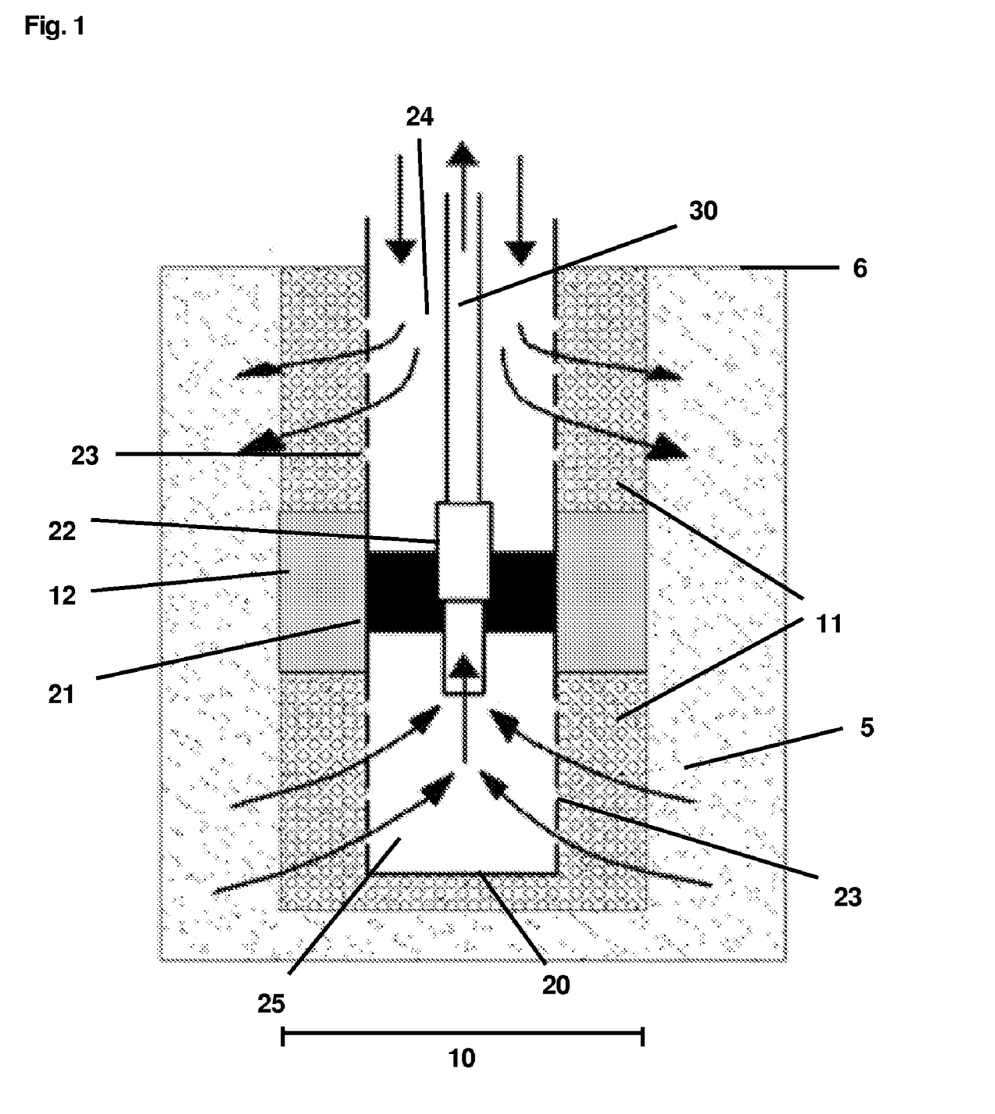
FIG. 1 is a schematic cross-section of a system according to the invention.
Figure 2:
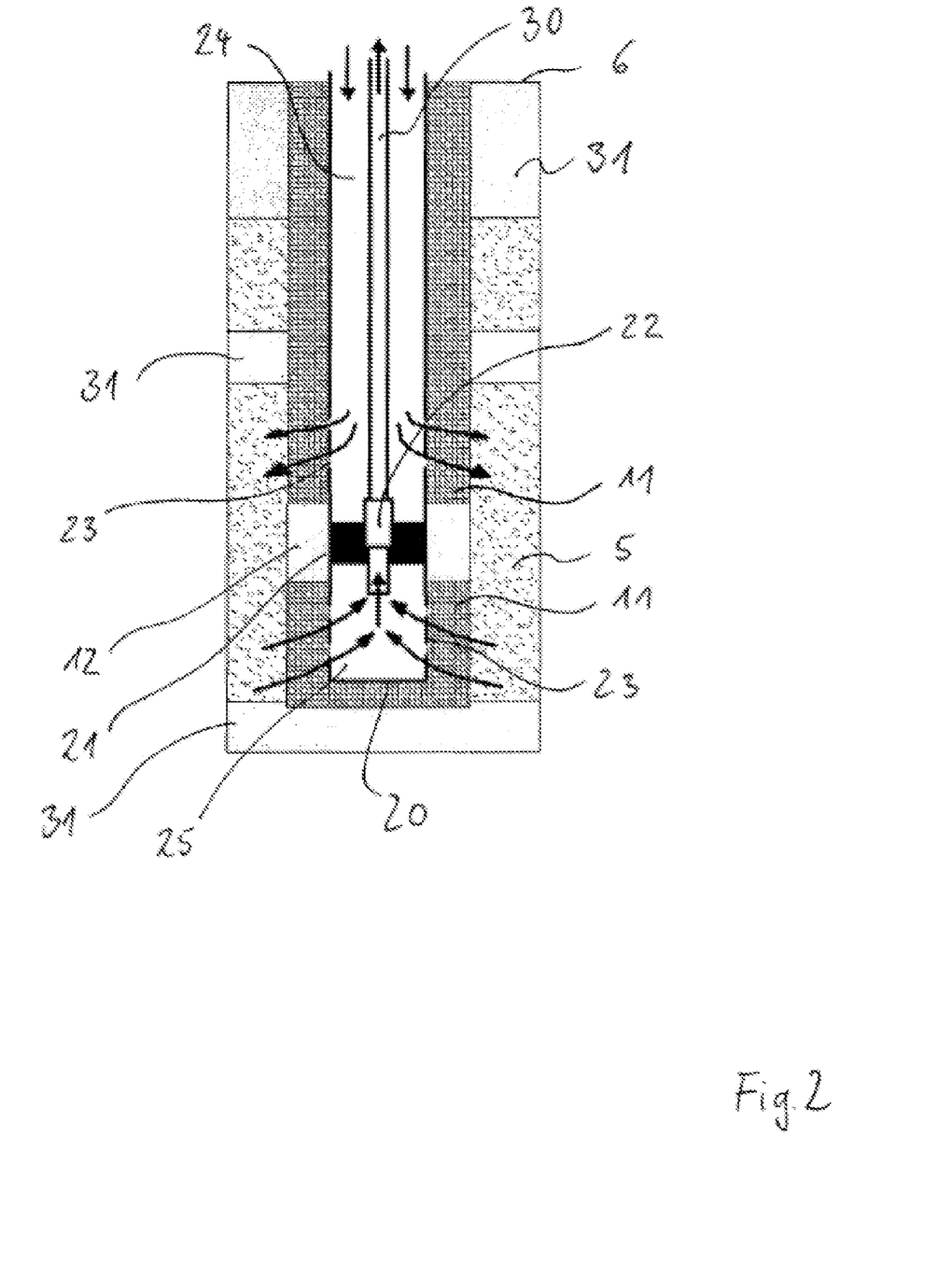
FIG. 2 is a schematic cross-section of a system with a plurality of groundwaters.

Without intending to be limiting, the invention will be explained in more detail with reference to the examples and figures wherein:

FIG. 1 is a schematic cross-section of a system;

FIG. 2 is a schematic cross-section of a system with a plurality of groundwaters.

FIGS. 1 and 2 show a schematic cross-section of a system according to the invention with a main pipe (20). A bore (10) is arranged in the soil (5), and the bore (10) ends at the soil surface (6). The main pipe (20) is arranged preferably centrally within the bore (20) and is surrounded by a porous bed (11). Preferably half-way up a groundwater horizon, the main pipe (20) has a transverse seal (21) which has an opening in the center thereof wherein a pump (22) is arranged. Owing to the transverse seal (21), upper and lower interior spaces (24, 25) are formed in the main pipe (20). In its upper and lower parts the main pipe has through-openings (23) allowing inflow of groundwater into the main pipe or outflow of water introduced from the above-ground closed circuit.

The pump (22) conveys the water preferably in the direction of the soil surface (6). The arrows in FIG. 1 or 2 indicate the flow direction of the water.

The upper part of the pump is followed by a preferably insulated extraction pipe (30) through which the water is conveyed into an above-ground circuit.

A sealing material (12) is incorporated in the surrounding porous bed (11) around the main pipe at the level of the transverse seal (21) inside the main pipe so that the porous bed (11) is separated into an upper part and a lower part hydraulically separated from each other. "At the level of the transverse seal" means that the porous bed is hydraulically interrupted in the region of the transverse seal, and the height or thickness of the material causing the interruption can be identical or similar to, smaller or greater than that of the transverse seal.

FIG. 2 shows a device as in FIG. 1, with a plurality of groundwaters separated by natural sedimentation strata or aquicludes (31) being illustrated in FIG. 2. The explanations in FIG. 1 apply to those in FIG. 2 correspondingly.

The invention is not restricted to the embodiments illustrated in the figures.

LIST OF REFERENCE NUMBERS

5 Soil
6 Soil surface
10 Bore
11 Porous bed
12 Sealing material
20 Main pipe
21 Transverse seal
22 Pump 23 Through-opening
24 Upper interior space of main pipe
25 Lower interior space of main pipe
30 Extraction pipe
31 Sedimentation layers or aquicludes

The invention claimed is:

1. A system for utilization of geothermal heat comprising a main pipe,
wherein
the main pipe is divided into an upper part and a lower part by a transverse seal, and wherein the transverse seal has an opening which has a pump arranged therein that triggers and/or supports flow, which conveys water from the lower part of the main pipe, said pump being connected with an extraction pipe which in turn is connected with an above-ground closed circuit, said closed circuit, at its other end, leading to the upper part of the main pipe, and the main pipe having through-openings towards the surroundings upstream and downstream of the transverse seal, said through-openings towards the surroundings downstream of the transverse seal being in form of filter sections and said main pipe being surrounded by a porous bed which is a glass bed made of glass spheres which surrounds the remaining hollow space of the bore around the main pipe, said porous bed being interrupted by a sealing material at the level of the transverse seal inside the main pipe so that the porous bed is hydraulically interrupted, wherein the glass spheres have a diameter of 0.5 to 10 mm and wherein the porous bed has an effective pore space of more than 30%.

2. The system according to claim 1,
wherein
the sealing material has an to and bottom surface and both surfaces are in direct contact with said glass spheres of said porous bed.

3. The system according to claim 1,
wherein
the sealing material separating the porous bed is clay or cement.

4. The system according to claim 1,
wherein
the main pipe is made of PVC, stainless steel or a combination thereof.

5. A method for the extraction of geothermal heat comprising providing the system according to claim 1 and extracting geothermal heat via said system.

6. A method for the dissipation of heat comprising providing the system according to claim 1 and dissipating heat via said system.

7. A method for extracting groundwater comprising providing the system according to claim 1 and extracting groundwater via said system.

8. A method for decontaminating groundwater comprising providing the system according to claim 1 and decontaminating groundwater via said system.

9. A method for producing electricity comprising the system according to claim 1 and producing electricity via said system.

10. The system according to claim 1,
wherein
the main pipe is arranged centrally in a bore of a well.

11. The system according to claim 1, wherein the extraction pipe is insulated.

12. The system according to claim 1, wherein the glass spheres have a diameter of from 1.5 to 5 mm.

* * * * *